(12) United States Patent
Pietraski et al.

(10) Patent No.: US 7,912,120 B2
(45) Date of Patent: *Mar. 22, 2011

(54) METHOD AND APPARATUS FOR ESTIMATING AND CORRECTING BASEBAND FREQUENCY ERROR IN A RECEIVER

(75) Inventors: Philip J. Pietraski, Huntington Station, NY (US); Rui Yang, Greenlawn, NY (US); Mihaela Beluri, Glen Cove, NY (US); Alpaslan Demir, Commack, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/688,242

(22) Filed: Jan. 15, 2010

(65) Prior Publication Data

US 2010/0316109 A1 Dec. 16, 2010

Related U.S. Application Data

(63) Continuation of application No. 12/265,929, filed on Nov. 6, 2008, now abandoned, which is a continuation of application No. 11/209,097, filed on Aug. 22, 2005, now Pat. No. 7,457,347, which is a continuation-in-part of application No. 12/512,203, filed on Jul. 30, 2009, which is a continuation of application No. 11/265,373, filed on Nov. 2, 2005, now Pat. No. 7,570,690.

(60) Provisional application No. 60/625,874, filed on Nov. 8, 2004, provisional application No. 60/625,188, filed on Nov. 5, 2004.

(51) Int. Cl.
H03H 7/30 (2006.01)
H03H 7/40 (2006.01)
H03K 5/159 (2006.01)

(52) U.S. Cl. ...................................... 375/232; 375/344
(58) Field of Classification Search .................. 375/136, 375/142–144, 147–152, 229–236, 344
See application file for complete search history.

(56) References Cited

U.S. PATENT DOCUMENTS

| | | | |
|---|---|---|---|
| 4,743,864 A | 5/1988 | Nakagawa et al. |
| 5,091,956 A | 2/1992 | Miki |
| 5,159,282 A | 10/1992 | Serizawa et al. |
| 5,200,977 A | 4/1993 | Ohnishi |
| 5,572,558 A | 11/1996 | Beherns |
| 5,664,595 A | 9/1997 | Vonderhorst et al. |

(Continued)

FOREIGN PATENT DOCUMENTS

EP 1 160 981 12/2001

(Continued)

*Primary Examiner* — Curtis B Odom
(74) *Attorney, Agent, or Firm* — Volpe And Koenig, P.C.

(57) ABSTRACT

A method and apparatus for estimating and correcting baseband frequency error in a receiver are disclosed. An equalizer performs equalization on a sample data stream and generates filter tap values based on the equalization. An estimated frequency error signal is generated based on at least one of the filter tap values. A rotating phasor is generated based on the estimated frequency error signal. The rotating phasor signal is multiplied with the sample data stream to correct the frequency of the sample data stream. Alternatively, a channel estimator performs channel estimation and generates Rake receiver finger weights based on at least one of the finger weights. An estimated frequency error signal is generated based on at least one of the finger weights.

7 Claims, 7 Drawing Sheets

U.S. PATENT DOCUMENTS

| | | | |
|---|---|---|---|
| 5,940,450 | A | 8/1999 | Koslov et al. |
| 5,974,434 | A | 10/1999 | Rose |
| 6,134,260 | A | 10/2000 | Bottomley et al. |
| 6,275,330 | B1 | 8/2001 | Izumi |
| 6,400,758 | B1 | 6/2002 | Goldston et al. |
| 6,510,187 | B2 | 1/2003 | Saito et al. |
| 6,577,690 | B1 | 6/2003 | Barman et al. |
| 6,731,745 | B1 | 5/2004 | Goto |
| 6,904,098 | B1 | 6/2005 | Isaksen et al. |
| 7,274,727 | B2 | 9/2007 | Nakayama |
| 7,457,347 | B2 * | 11/2008 | Pietraski et al. ............. 375/144 |
| 2001/0008543 | A1 | 7/2001 | Tanada |
| 2002/0024996 | A1 | 2/2002 | Agazzi et al. |
| 2002/0045433 | A1 * | 4/2002 | Vihriala ........................ 455/313 |
| 2002/0114385 | A1 | 8/2002 | Gu et al. |
| 2002/0196866 | A1 | 12/2002 | Diehl et al. |
| 2003/0086366 | A1 | 5/2003 | Branlund et al. |
| 2003/0103588 | A1 | 6/2003 | Tanada et al. |
| 2003/0231708 | A1 | 12/2003 | Kim et al. |
| 2004/0101068 | A1 | 5/2004 | Wang et al. |
| 2004/0127164 | A1 | 7/2004 | Mondragon-Torres et al. |
| 2004/0161066 | A1 | 8/2004 | Hwang et al. |
| 2005/0232347 | A1 | 10/2005 | Chang |
| 2005/0243955 | A1 | 11/2005 | Mondragon-Torres et al. |

FOREIGN PATENT DOCUMENTS

| | | |
|---|---|---|
| EP | 1 336 254 | 8/2003 |
| GB | 2389283 | 12/2003 |
| JP | 03-230649 | 10/1991 |
| JP | 03230649 | 10/1991 |
| JP | 03-245628 | 11/1991 |
| JP | 06-237147 | 8/1994 |
| JP | 07-086993 | 3/1995 |
| JP | 2001-177451 | 6/2001 |
| JP | 2002-217776 | 8/2002 |
| KR | 1998-064798 | 1/1998 |
| TW | 317677 | 10/1997 |
| TW | 384582 | 3/2000 |
| TW | 428309 | 4/2001 |
| WO | 02/082758 | 10/2002 |

\* cited by examiner

FIG. 10

METHOD AND APPARATUS FOR ESTIMATING AND CORRECTING BASEBAND FREQUENCY ERROR IN A RECEIVER

CROSS REFERENCE TO RELATED APPLICATIONS

This application is a continuation of U.S. patent application Ser. No. 12/265,929, filed Nov. 6, 2008, which is a continuation of U.S. patent application Ser. No. 11/209,097, filed Aug. 22, 2005, now as U.S. Pat. No. 7,457,347, issued Nov. 25, 2008, which claims the benefit of U.S. Provisional Patent Application No. 60/625,874, filed Nov. 8, 2004; and is a continuation-in-part of U.S. patent application Ser. No. 12/512,203, filed Jul. 30, 2009, which is a continuation of U.S. patent application Ser. No. 11/265,373, filed Nov. 2, 2005, now U.S. Pat. No. 7,570,690, issued Aug. 4, 2009, which claims the benefit of U.S. Provisional Patent Application No. 60/625, 188, filed Nov. 5, 2004, which are incorporated by reference as if fully set forth.

FIELD OF INVENTION

The present invention is related to wireless receivers. More particularly, the present invention is related to a method and apparatus for estimating and correcting frequency error at baseband in a receiver.

BACKGROUND

Adaptive receivers, such as a normalized least mean square (NLMS) equalizer used in wireless transmit/receive units (WTRUs) and base stations, optimize their associated filter tap values through an iterative procedure that requires multiple iterations to near convergence. The tap values converge as time passes to a minimum mean square error (MMSE) solution used to perform channel estimation.

An NLMS receiver includes an equalizer having an equalizer filter which is continually in the process of converging as it tries to track a time-varying channel. The more complex it is to track the channel, the further the tap values of the equalizer will be from convergence. Generally, faster channels (i.e., channel states that evolve rapidly) are difficult for the equalizer to track. Residual automatic frequency control (AFC) errors in the baseband input into the equalizer cause channels to appear faster than they really are. The increase in the apparent speed of the channel can only be partially mitigated by increasing the step-size of an NLMS algorithm implemented by the NLMS receiver. The increased step-size allows the equalizer filter to more accurately track "fast" channels, but it also increases errors in the MMSE solution which cause degradation in the performance of the receiver.

Receivers that employ channel estimation are also degraded by residual AFC errors. Since the bandwidth of the appropriate equalizer filter used in channel estimation is a function of the apparent speed of the channel, large AFC errors force the use of wide-band filters that do not efficiently suppress noise, thus leading to less accurate channel estimates. A simple solution is desired to suppress the residual AFC errors.

SUMMARY

The present invention is related to a method and apparatus for estimating and correcting baseband frequency error in a receiver. In one embodiment, an equalizer performs equalization on a sample data stream and generates filter tap values based on the equalization. An estimated frequency error signal is generated based on at least one of the filter tap values. A rotating phasor is generated based on the estimated frequency error signal. The rotating phasor signal is multiplied with the sample data stream to correct the frequency of the sample data stream. In another embodiment, a channel estimator performs channel estimation and generates Rake receiver finger weights based on at least one of the finger weights. An estimated frequency error signal is generated based on at least one of the finger weights.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The preferred embodiments will be described with reference to the drawing figures where like numerals represent like elements throughout.

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "base station" includes but is not limited to an access point (AP), a Node-B, a site controller or any other type of interfacing device in a wireless environment.

The features of the present invention may be incorporated into an integrated circuit (IC) or be configured in a circuit comprising a multitude of interconnecting components.

Hereinafter, the present invention will be described in terms of the NLMS equalizer. However, it should be noted that the NLMS equalizer based receiver is provided as an example and the present invention can be applied to receivers implementing any other adaptive equalization algorithm and to receivers employing channel estimation such as block based equalizers and rake receivers.

Figure 1:
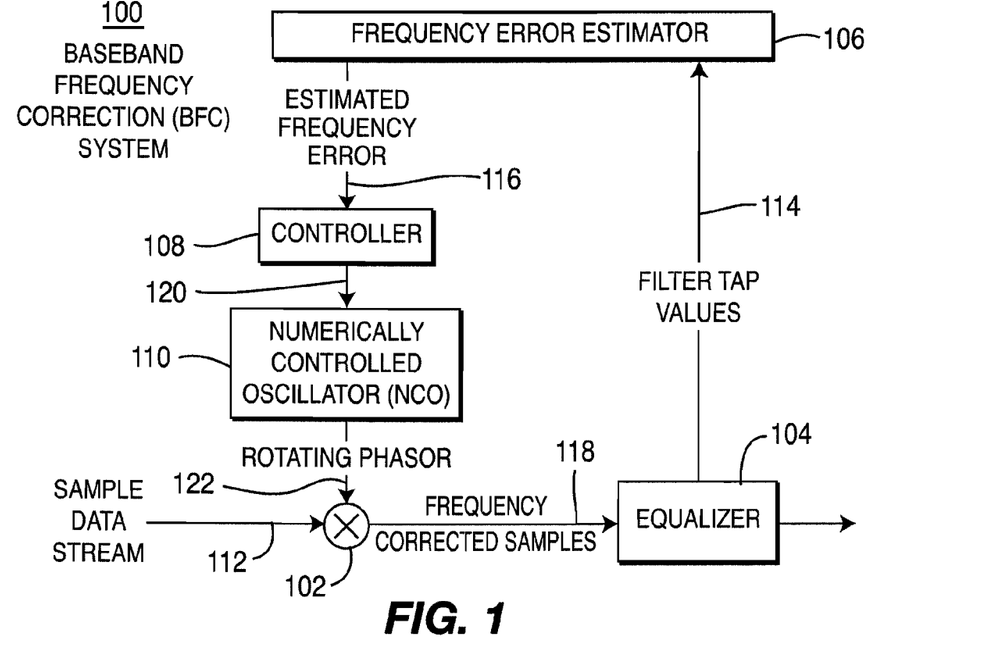
FIG. 1 is a block diagram of an example BFC system including a frequency error estimator for removing residual AFC errors in accordance with one embodiment of the present invention.

FIG. 1 is a block diagram of an exemplary BFC system 100 for removing residual AFC errors in accordance with one embodiment of the present invention. The BFC system 100 may be incorporated in a WTRU or a base station. The BFC system 100 includes a multiplier 102, an equalizer 104, a frequency error estimator 106, a controller 108 and a numerically controlled oscillator (NCO) 110. The equalizer 104 processes a sample data stream 112 provided by a receiver front end (not shown) via the multiplier 102. The equalizer may operate in accordance with an NLMS algorithm. However, any other type of adaptive equalizer algorithm may be applied.

Filter tap values 114 generated by the equalizer 104 are provided as an input to the frequency error estimator 106. The frequency error estimator 106 generates an estimated frequency error signal 116. The residual frequency errors after AFC can be greatly reduced by BFC based solely on observation of at least one tap value in the equalizer 104, or alternatively from partial channel estimates, such as a Rake finger complex weight estimation. BFC is accomplished by estimating the frequency error based on observation of the one or more taps in the equalizer 104, generating a correction signal consisting of a complex sinusoid (or rotating phasor), correcting the input samples data stream by multiplying it by the phasor and applying frequency corrected samples 118 to the input of the equalizer 104 in a closed loop fashion.

The residual frequency error is estimated by periodically measuring the phase change of one or more of the tap values of the equalizer 104 (or alternatively, partial channel estimates). Much of the phase change measured on the equalizer filter taps 114 from sample to sample is due to noise and fading. However, phase changes due to fading and noise are zero mean (e.g., have a mean value of zero). Therefore, the expected value of any sample average will be zero, i.e., the average value of the signal is zero. Thus, filtering can be used to remove noise and fading components which cause phase change from the overall phase changes (due to, e.g., residual AFC errors) and to recover the slowly varying phase change due to the frequency error.

Once the frequency error is estimated by the frequency error estimator 106, the controller 108 processes the estimated frequency error signal 116 to generate a frequency adjustment signal 120. The controller 108 may simply adjust the gain of the estimated frequency error signal 116 or may process the estimated frequency error signal 116 with a more complicated algorithm (e.g., a proportional-integral-derivative (PID)). The frequency adjustment signal 120 is fed to the NCO 110 which generates a rotating phasor 122 which corresponds to the frequency adjustment signal 120. The multiplier 102 multiplies the rotating phasor 122 with the sample data stream 112 to generate the frequency corrected samples 118 input into the equalizer 104.

Residual AFC errors manifest themselves in the baseband as a multiplicative error in the baseband signal and has the form of a complex sinusoid, such as $g(t) * \exp(j*2pi*f*t)$ where $g(t)$ is the desired uncorrupted baseband signal and $\exp(j*2pi*f*t)$ is the complex sinusoid representing the error. By multiplying by $\exp(-j*2pi*f*t)$, the complex sinusoids cancel leaving only the desired signal $g(t)$. The estimated frequency error signal 116 is input to the controller 108 which, in turn, outputs a signal 120 which may be, for example, a scaled (i.e., proportional) version of the input, e.g., four times the value of the estimated frequency error signal 116. The output signal 120 of the controller 108 may also include other terms such as a term proportional to the integrals and/or derivatives of the estimated frequency error signal 116. More generally, the output signal 120 could also be clipped to be within some range or have other such non-linear function applied to it. The NCO (110) takes as an input a frequency value and outputs a constant magnitude complex signal with instantaneous frequency equal to the value of the input, e.g., $\exp(j*2pi*f*t)$, where f is the input frequency.

Figure 2:
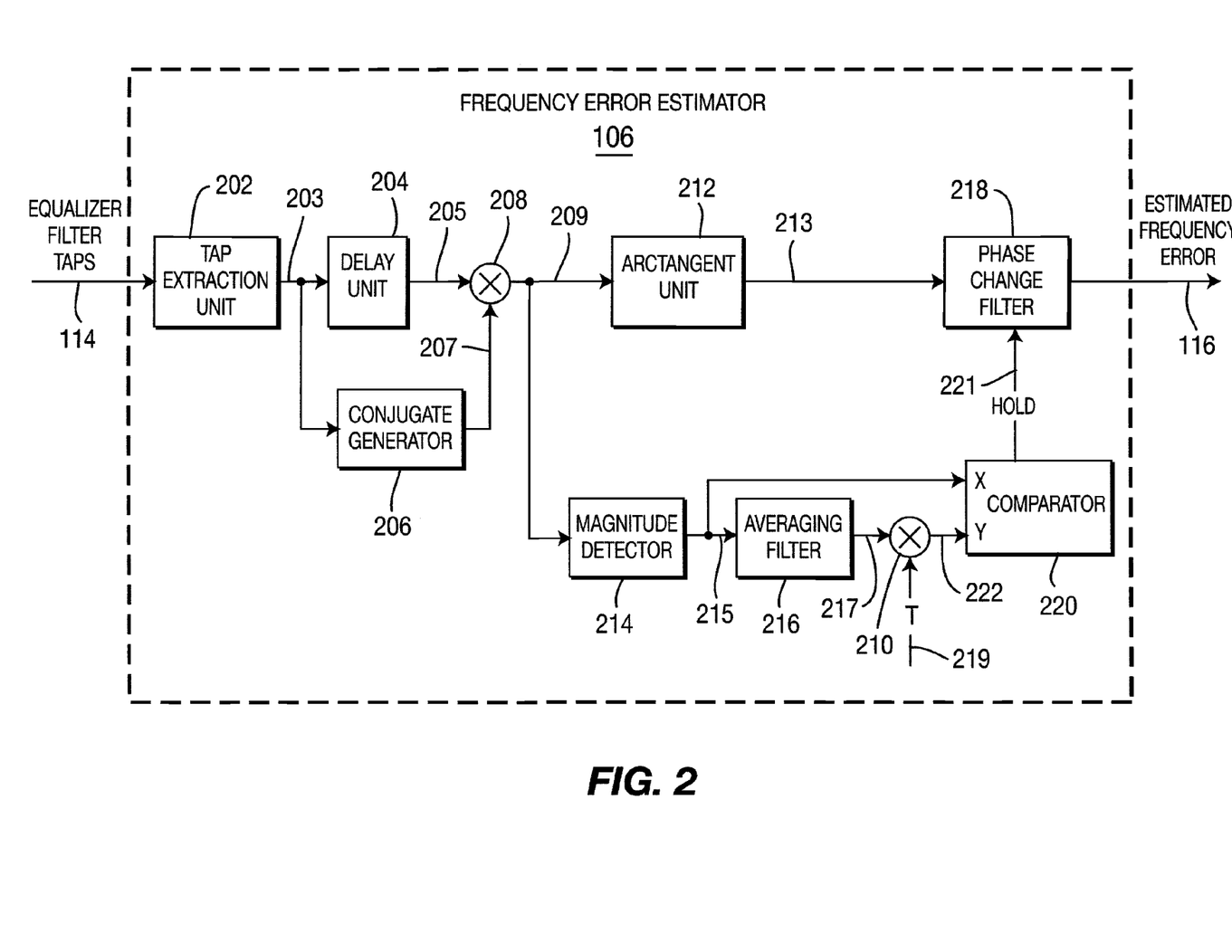
FIG. 2 is a block diagram of the frequency error estimator of the system 100 of FIG. 1.

FIG. 2 is a block diagram of the frequency error estimator 106 of the BFC system 100 shown in FIG. 1. The frequency error estimator 106 includes a tap extraction unit 202, a delay unit 204, a conjugate generator 206, multipliers 208, 210, an arctangent unit 212, a magnitude detector 214, an averaging filter 216, a phase change filter 218 and a comparator 220. The equalizer generates filter taps 114 which are supplied to the frequency error estimator 106.

In the frequency error estimator 106, the tap extraction unit 202 extracts and outputs an appropriate tap value or average of tap values onto an output signal 203 from the filter taps 114, (or alternatively from a channel estimator), to use for performing frequency estimation. For example, at least one appropriate tap value corresponding to an FSP in a particular channel may be extracted from the equalizer filter taps 114. The tap extraction unit 202 may also track frequency drifting of the extracted tap value.

The extracted tap value 203 is forwarded to a delay unit 204 and a conjugate unit 206. The delay unit 204 delays the extracted tap value 203 for a predetermined period of time by outputting a delayed tap value 205. The conjugate generator is used to generate a conjugate 207 of the extracted tap value 203. The multiplier 208 multiplies the delayed tap value 205 by the conjugate tap value 207. The output 209 of the multiplier 208 has a phase value equal to the phase difference between the delayed tap value 205 and the conjugate tap value 207. This phase value is proportional to the average frequency of the signal 203 and therefore of the sample data stream 112.

The arctangent unit 212 measures an angle value 213 of the output 209 of the multiplier 208. The angle value 213 is equal to the phase difference between signal 205 and signal 207. Averaging the angle value 213 is therefore equivalent to averaging the phase difference between signal 205 and signal 207. The angle value 213 is filtered by the phase change filter 218 for averaging the angle value 213. The measured average phase difference and the known delay are used to generate the estimated frequency error signal 116.

For example, with a delay D (sec) and phase measured in radians, the gain of the frequency error estimator 106 is $1/(2*PI*D)$. The "gain" refers to the conversion of a signal with a net frequency error, (as indicated by signal 114), to an observed value of the estimated frequency error signal 116. If the signal 114 has an average frequency of 1 Hz, then the output value on the estimated frequency error signal 116 will be 1/(2*PI*D).

The magnitude detection unit 214 calculates the magnitude of the output 209 of the multiplier 208 and sends a calculated magnitude value 215 to a first input, X, of the comparator 220 and to the averaging filter 216 for averaging. The multiplier 210 multiplies the output signal 217 of the averaging filter 216 (i.e., the average value of signal 215) with a threshold factor value 219 (e.g., a scaling factor having a value T) to generate a threshold signal 222 which is sent to a second input, Y, of the comparator 220. The value of the threshold signal 222 may be set to a fraction of the average amplitude of the output 209 of the multiplier 208. The threshold factor value, T, may be set, for example, to ⅓. The comparator 220 compares the calculated magnitude value 215 with the value of the threshold signal 222 and sends a hold signal 221 to the phase change filter 218 if the calculated magnitude value 215 is below the value of the threshold signal 222.

The magnitude of the output 209 of the multiplier 208 may be measured and compared to the average amplitude of the output 209 of the multiplier 208, whereby the phase change filter 218 is paused whenever the magnitude of the output 209 of the multiplier 208 drops below a threshold. When the filter 218 is paused, the estimated frequency error signal 116 does not change (i.e., the signal 116 is not updated), the input 213 is not used, and the internal state of the filter 218 does not change. The hold signal 221 is true whenever the signal 209 is relatively small. This has the effect of discarding the angel values on signal 213 whenever they are noisiest, and improving the estimated frequency error signal 116 when the channel undergoes deep fades.

Alternately, a power detector (not shown) may be substituted for the magnitude detector 214 to calculate the average power (i.e., the squared magnitude) of the output 209 of the multiplier 208, whereby the instantaneous power of the output 209 is compared to some fraction of the average power. Other variations are also possible.

Figure 3:
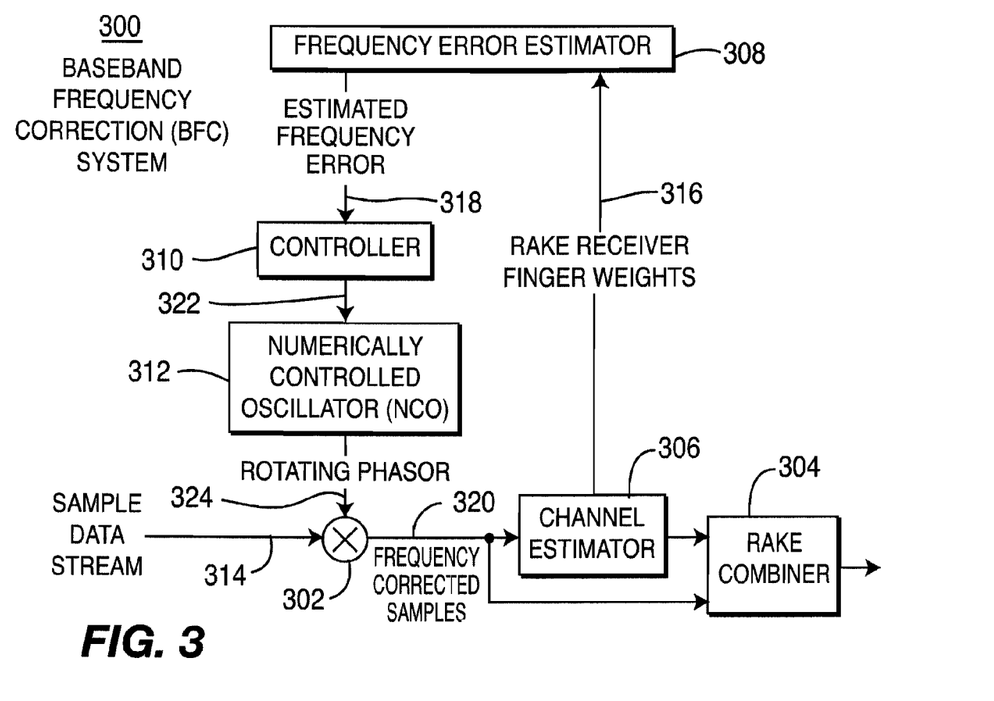
FIG. 3 is a block diagram of an example BFC system in accordance with another embodiment of the present invention.

FIG. 3 is a block diagram of a BFC system 300 for removing residual AFC errors in accordance with another embodiment of the present invention. The BFC system 100 may be incorporated in a WTRU or a base station. The BFC system 300 includes a multiplier 302, a rake combiner (or a block equalizer) 304, a channel estimator 306, a frequency error estimator 308, a controller 310, and an NCO 312.

In a Rake receiver, a finger weight is determined based on the channel estimation on a particular multipath component assigned to a Rake finger. The channel estimator 306 generates Rake receiver finger weights 316 which are provided as an input to the frequency error estimator 308. The frequency error estimator 308 operates in a fashion similar to the frequency error estimator 106 shown in FIGS. 1 and 2.

Once the frequency error is estimated by the frequency error estimator 308, the controller 310 processes the estimated frequency error signal 318 to generate a frequency adjustment signal 322. The frequency adjustment signal 322 is fed to the NCO 312 which generates a rotating phasor 324 which corresponds to the frequency adjustment signal 322. The multiplier 302 multiplies the rotating phasor 324 with the sample data stream 314 to generate the frequency corrected samples 320 input into the channel estimator 306 and the Rake combiner 304. Alternatively, a block equalizer may be used instead of the Rake combiner 304.

The estimated frequency error signal 318 generated by the frequency error estimator 308 is processed by the controller 310 and the NCO 312 which applies a rotating phasor 324 to the sample data stream 314.

Figure 4:
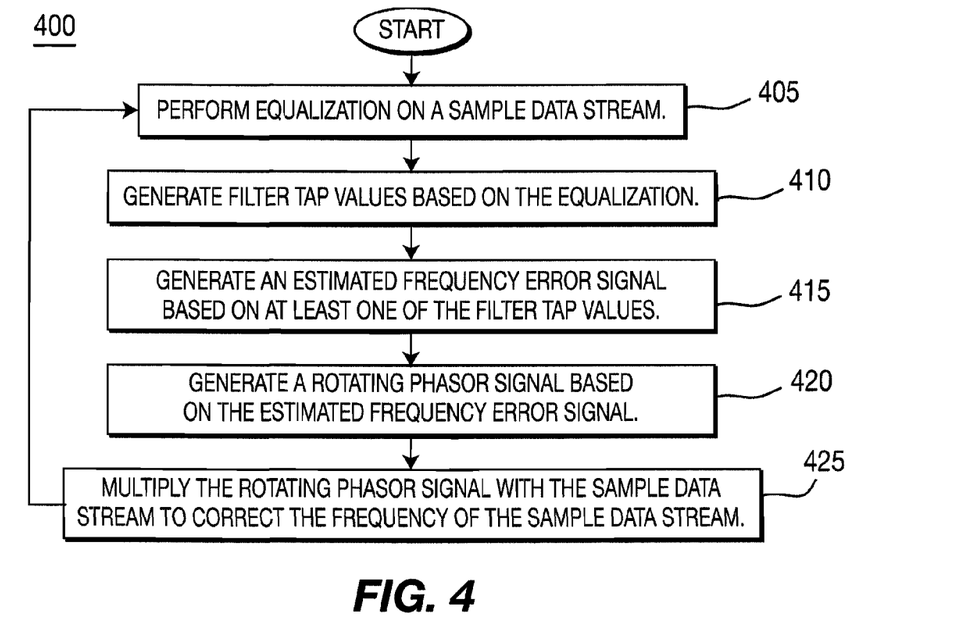
FIG. 4 is a high level flow diagram of a process for correcting the frequency of a sample data stream in a wireless communication receiver having an equalizer that performs equalization in accordance with one embodiment of the present invention.

FIG. 4 is a high level flow diagram of a process 400 including method steps for correcting the frequency of a sample data stream in a wireless communication receiver having an equalizer that performs equalization in accordance with one embodiment of the present invention. In step 405, equalization is performed on a sample data stream. In step 410, filter tap values are generated based on the equalization. In step 415, an estimated frequency error signal is generated based on at least one of the filter tap values. In step 420, a rotating phasor signal is generated based on the estimated frequency error signal. In step 425, the rotating phasor signal is multiplied with the sample data stream to correct the frequency of the sample data stream.

Figure 5:
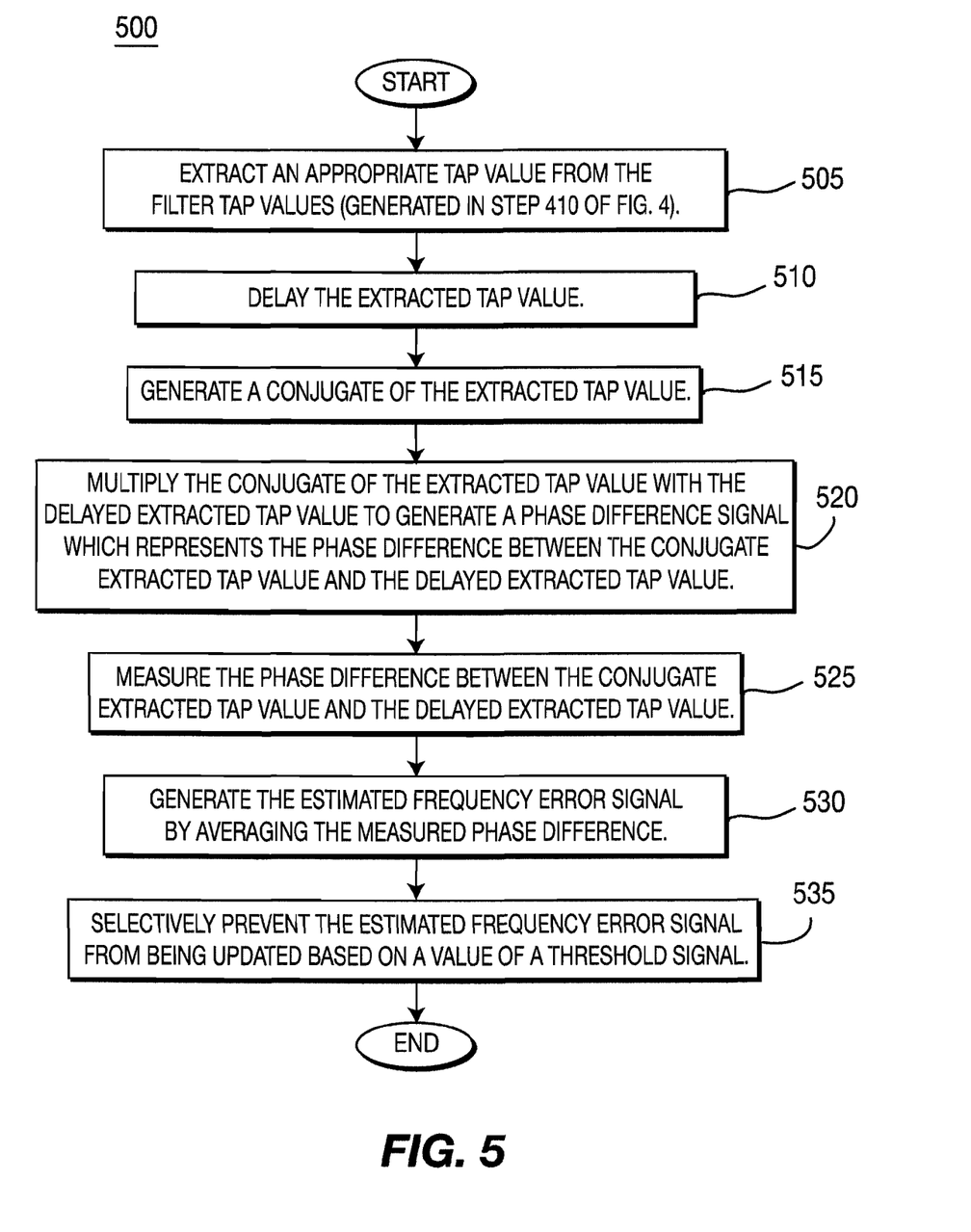
FIG. 5 is a flow diagram of a process for generating the estimated frequency error signal based on based on a filter tap value extracted from filter tap values generated by the equalizer used in the process of FIG. 4.

FIG. 5 is a flow diagram of a process 500 including method steps for generating the estimated frequency error signal based on a filter tap value extracted from filter tap values generated by the equalizer used in process 400 of FIG. 4. In step 505, an appropriate tap value is extracted from the filter tap values (generated in step 410 of FIG. 4). In step 510, the extracted tap value is delayed. In step 515, a conjugate of the extracted tap value is generated. In step 520, the conjugate of the extracted tap value is multiplied with the delayed extracted tap value to generate a phase difference signal which represents the phase difference between the conjugate extracted tap value and the delayed extracted tap value. In step 525, the phase difference between the conjugate extracted tap value and the delayed extracted tap value is measured. In step 530, the estimated frequency error signal is generated by averaging the measured phase difference. In step 535, the estimated frequency error signal is selectively prevented from being updated based on a value of a threshold signal.

Figure 6:
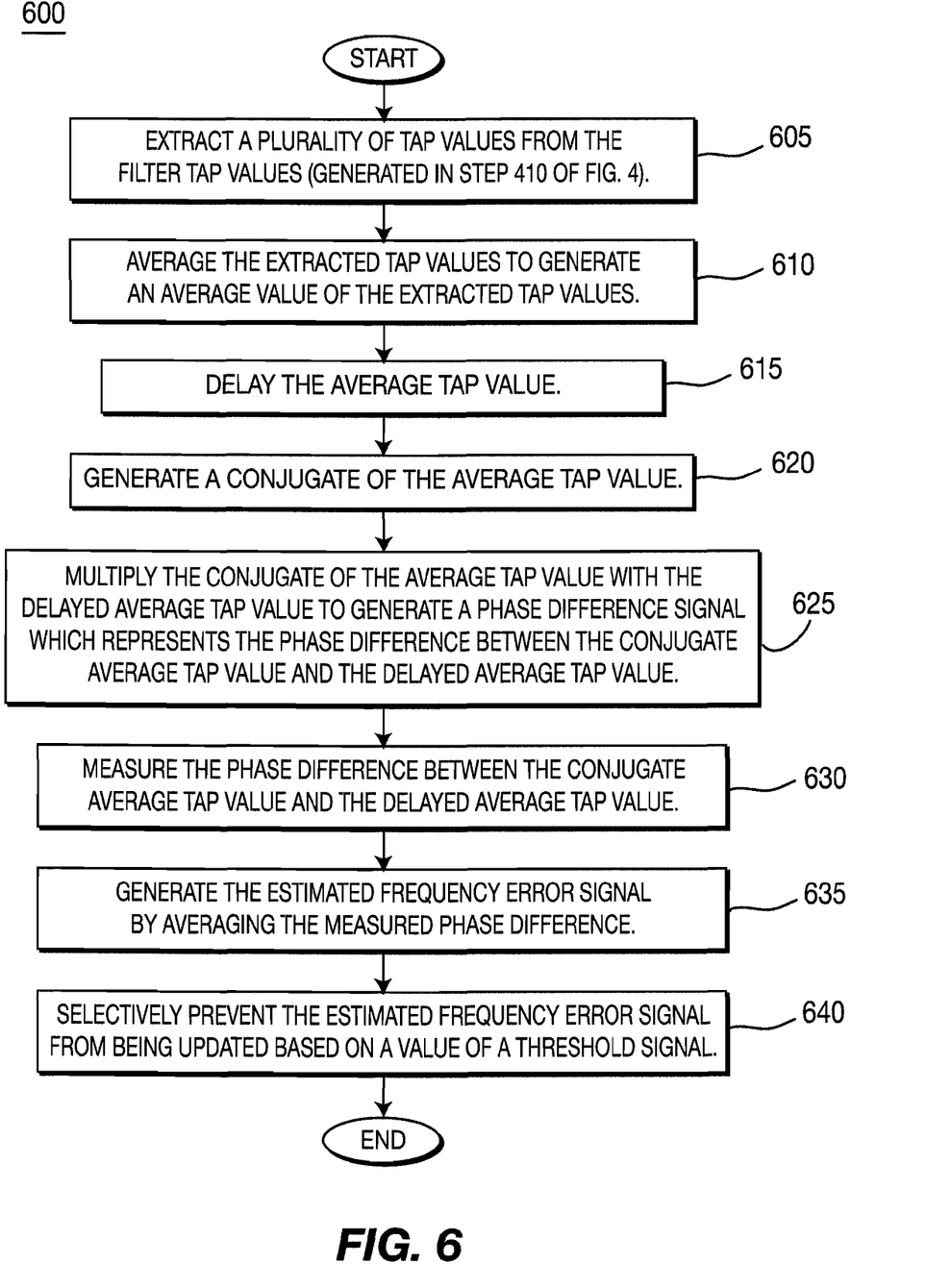
FIG. 6 is a flow diagram of a process for generating the estimated frequency error signal based on a plurality of extracted tap values that are averaged in accordance with one embodiment of the present invention.

FIG. 6 is a flow diagram of a process 600 including method steps for generating the estimated frequency error signal based on a plurality of extracted tap values that are averaged in accordance with one embodiment of the present invention. In step 605, a plurality of tap values are extracted from the filter tap values (generated in step 410 of FIG. 4). In step 610, the extracted tap values are averaged to generate an average value of the extracted tap values. In step 615, the average tap value is delayed. In step 620, a conjugate of the average tap value is generated. In step 625, the conjugate of the average tap value is multiplied with the delayed average tap value to generate a phase difference signal which represents the phase difference between the conjugate average tap value and the delayed average tap value. In step 630, the phase difference between the conjugate average tap value and the delayed average tap value is measured. In step 635, the estimated frequency error signal is generated by averaging the measured phase difference. In step 640, the estimated frequency error signal is selectively prevented from being updated based on a value of a threshold signal.

Figure 7:
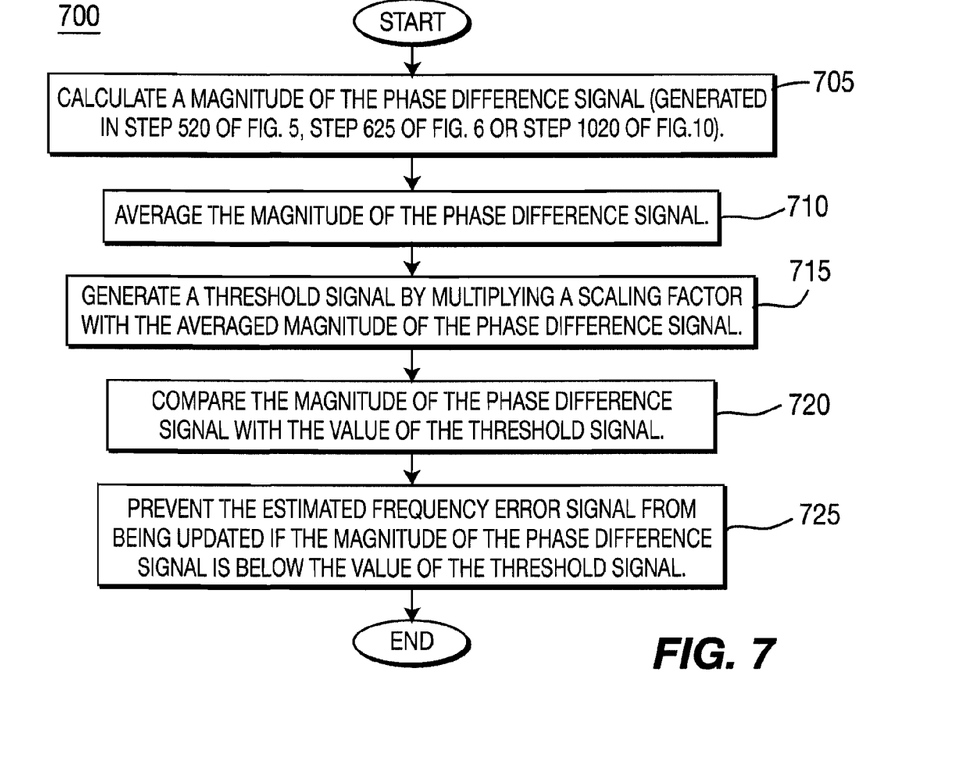
FIG. 7 is a flow diagram of a process for comparing the magnitude of the phase difference signal with the value of the threshold signal to determine whether the estimated frequency error signal should be prevented from being updated in accordance with one embodiment of the present invention.

FIG. 7 is a flow diagram of a process 700 including method steps for comparing the magnitude of the phase difference signal with the value of the threshold signal to determine whether the estimated frequency error signal should be prevented from being updated in accordance with one embodiment of the present invention. In step 705, a magnitude of the phase difference signal is calculated. In step 710, the magnitude of the phase difference signal is averaged. In step 715, the threshold signal is generated by multiplying a scaling factor with the averaged magnitude of the phase difference signal. In step 720, the magnitude of the phase difference signal is compared with the value of the threshold signal. In step 725, the estimated frequency error signal is prevented from being updated if the magnitude of the phase difference signal is below the value of the threshold signal.

Figure 8:
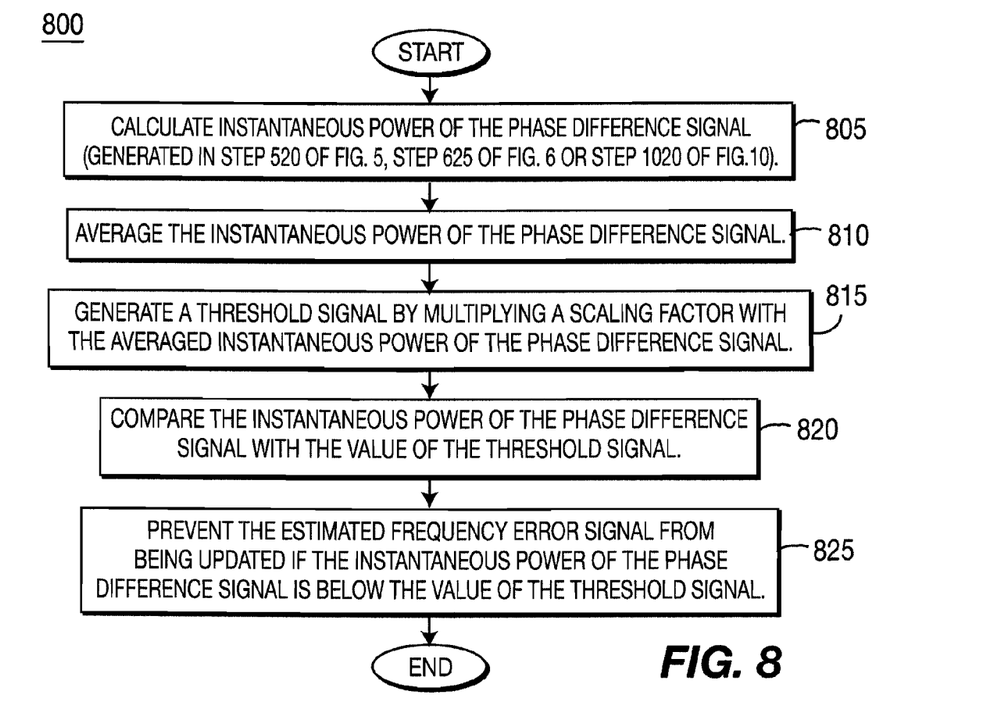
FIG. 8 is a flow diagram of a process for comparing the instantaneous power of the phase difference signal with the value of the threshold signal to determine whether the estimated frequency error signal should be prevented from being updated in accordance with one embodiment of the present invention.

FIG. 8 is a flow diagram of a process 800 including method steps for comparing the instantaneous power of the phase difference signal with the value of the threshold signal to determine whether the estimated frequency error signal should be prevented from being updated in accordance with one embodiment of the present invention. In step 805, the instantaneous power of the phase difference signal is calculated. In step 810, the instantaneous power of the phase difference signal is averaged. In step 815, the threshold signal is generated by multiplying a scaling factor with the averaged instantaneous power of the phase difference signal. In step 820, the instantaneous power of the phase difference signal is compared with the value of the threshold signal. In step 825, the estimated frequency error signal is prevented from being updated if the instantaneous power of the phase difference signal is below the value of the threshold signal.

Figure 9:
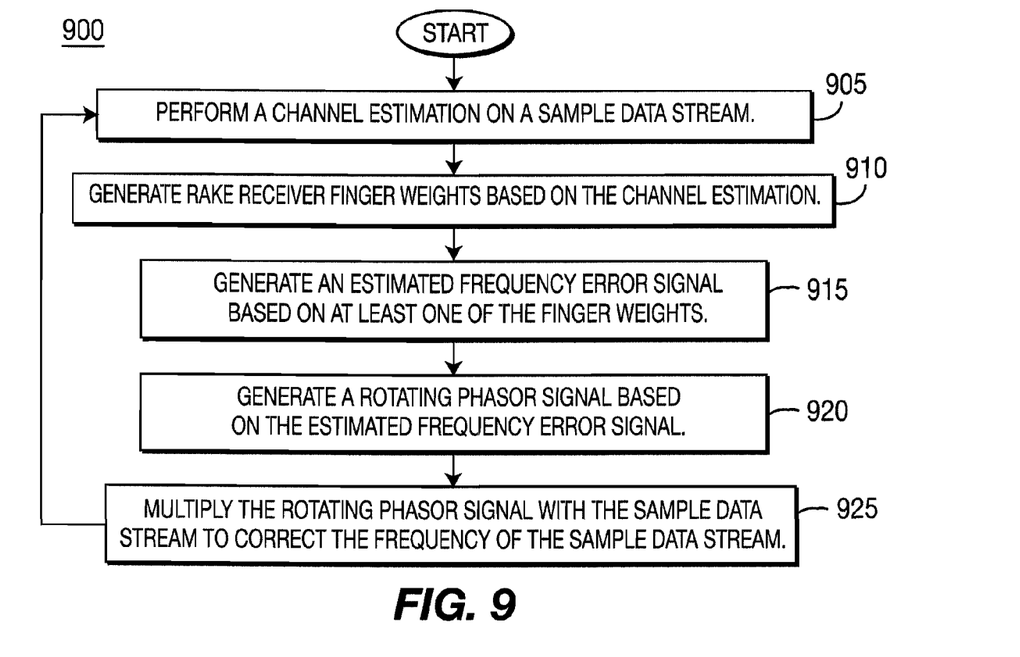
FIG. 9 is a high level flow diagram of a process for correcting the frequency of a sample data stream in a wireless communication receiver having a channel estimator that performs channel estimation in accordance with one embodiment of the present invention.

FIG. 9 is a high level flow diagram of a process 900 including method steps for correcting the frequency of a sample data stream in a wireless communication receiver having a channel estimator that performs channel estimation in accordance with one embodiment of the present invention. In step 905, channel estimation is performed on a sample data stream. In step 910, Rake receiver finger weights are generated based on the channel estimation. In step 915, an estimated frequency error signal is generated based on at least one of the finger weights. In step 920, a rotating phasor signal is generated based on the estimated frequency error signal. In step 925, the rotating phasor signal is multiplied with the sample data stream to correct the frequency of the sample data stream.

Figure 10:
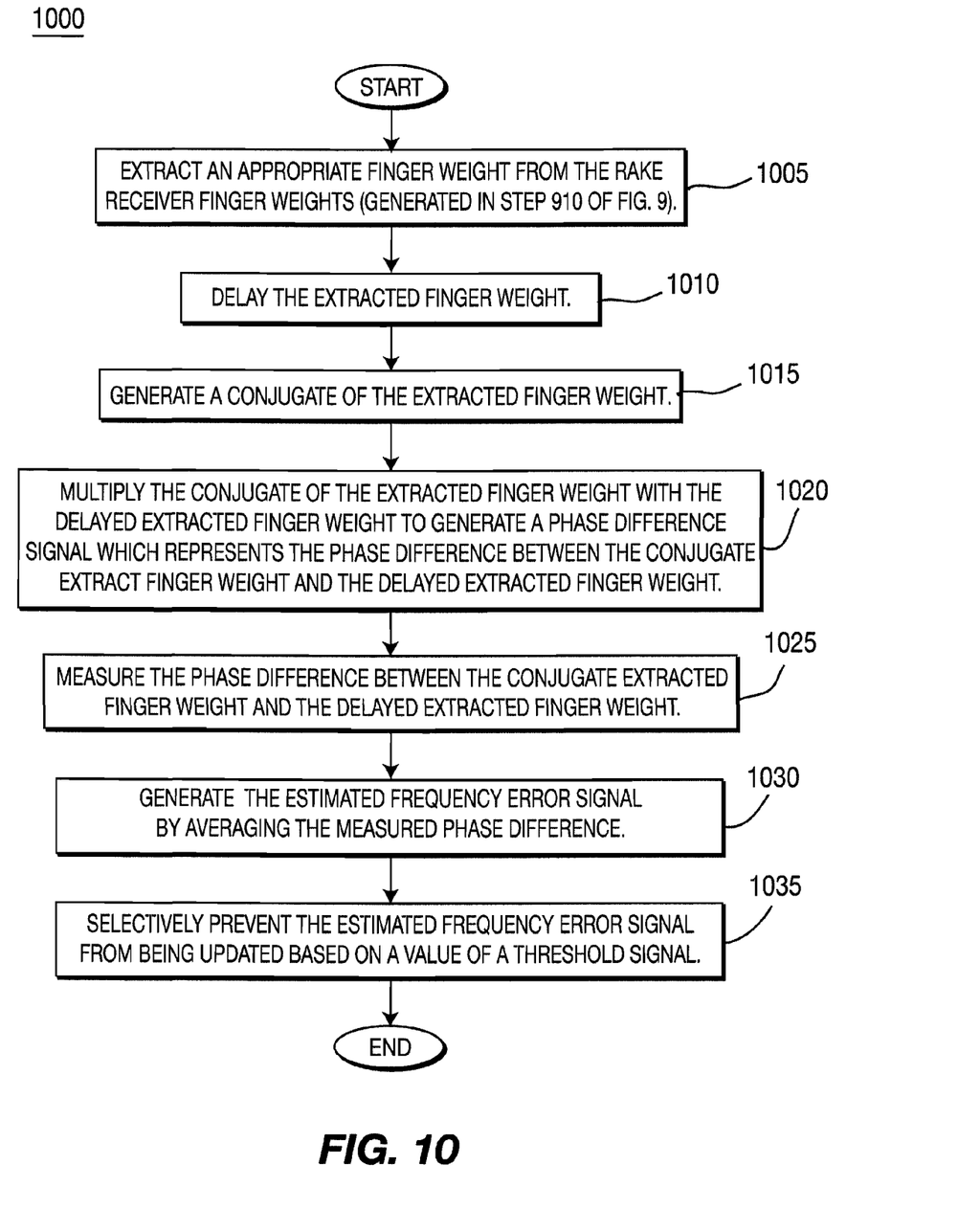
FIG. 10 is a flow diagram of a process for generating the estimated frequency error signal based on a finger weight extracted from Rake receiver finger weights generated by the channel estimator used in the process of FIG. 9.

FIG. 10 is a flow diagram of a process 1000 including method steps for generating the estimated frequency error signal based on a finger weight extracted from Rake receiver finger weights generated by the channel estimator used in the process 900 of FIG. 9. In step 1005, an appropriate finger weight is extracted from the Rake receiver finger weights (generated in step 910 of FIG. 9). In step 1010, the extracted finger weight is delayed. In step 1015, a conjugate of the extracted finger weight is generated. In step 1020, the conjugate of the extracted finger weight is multiplied with the delayed extracted finger weight to generate a phase difference signal which represents the phase difference between the conjugate extracted finger weight and the delayed extracted finger weight. In step 1025, the phase difference between the conjugate extracted finger weight and the delayed extracted finger weight is measured. In step 1030, the estimated frequency error signal is generated by averaging the measured phase difference. In step 1035, the estimated frequency error signal is selectively prevented from being updated based on a value of a threshold signal.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A receiver comprising:
    a channel estimator configured to perform a channel estimation on a sample data stream and configured to generate Rake receiver finger weights based on the channel estimation;
    a frequency error estimator configured to generate an estimated frequency error signal based on at least one of the finger weights, wherein the frequency error estimator comprises:
        a tap extraction unit configured to extract a plurality of Rake receiver finger weights from the Rake receiver finger weights generated by the channel estimator, and average the extracted finger weights to generate an average finger weight of the extracted finger weights;
        a delay unit, coupled to the tap extraction unit, configured to delay the average finger weight;
        a conjugate generator, coupled to the tap extraction unit and the delay unit, configured to generate a conjugate of the average finger weight;
        a first multiplier, coupled to the delay unit and the conjugate generator, configured to multiply the conjugate of the average finger weight with the delayed average finger weight to generate a phase difference signal which represents the phase difference between the conjugate average finger weight and the delayed average finger weight;
        an arctangent unit, coupled to the output of the first multiplier, configured to measure the phase difference between the conjugate average finger weight and the delayed average finger weight;
        a first filter configured to average the measured phase difference, whereby the averaged phase difference is output from the frequency error estimator as the estimated frequency error signal;
        a comparator circuit, coupled to the multiplier and the first filter, configured to selectively send a hold signal to the first filter based on a value of a threshold signal, wherein the hold signal causes the first filter to pause;
    a controller, coupled between the frequency error estimator and the oscillator, the controller configured to process the estimated frequency error signal received from the frequency error estimator with a proportional-integral-derivative, algorithm and inputting the processed estimated frequency error signal to the oscillator;
    an oscillator configured to generate a rotating phasor signal based on the processed estimated frequency error signal; and
    a second multiplier configured to multiply the rotating phasor signal with the sample data stream to correct the frequency of the sample data stream for further processing by the channel estimator.

2. The receiver of claim 1, wherein the comparator circuit comprises:
    a magnitude detector, coupled to the second multiplier and the arctangent unit, configured to calculate a magnitude of the phase difference signal; and
    a comparator configured to compare the magnitude of the phase difference signal with the value of the threshold signal and to generate the hold signal on a condition that the magnitude of the phase difference signal is below the value of the threshold signal.

3. The receiver of claim 2, wherein the comparator circuit further comprises:
    a second filter configured to average the magnitude of the phase difference signal; and
    a third multiplier configured to multiply a scaling factor with the averaged magnitude of the phase difference signal to generate the threshold signal.

4. The receiver of claim 1, wherein the comparator circuit comprises:
    a power detector configured to calculate instantaneous power of the phase difference signal; and
    a comparator configured to compare the instantaneous power of the phase difference signal with the value of the threshold signal, whereby the comparator generates the hold signal on a condition that the instantaneous power of the phase difference signal is below the value of the threshold signal.

5. The receiver of claim 4, wherein the comparator circuit further comprises:
 a second filter configured to average the instantaneous power of the phase difference signal; and
 a third multiplier configured to multiply a scaling factor with the averaged instantaneous power of the phase difference signal to generate the threshold signal.

6. The receiver of claim 1,
 wherein the controller is configured to adjust the gain of the estimated frequency error signal.

7. The receiver of claim 6, wherein the oscillator is a numerically controlled oscillator, controlled by the controller.

* * * * *